(12) United States Patent
Li et al.

(10) Patent No.: US 8,539,273 B2
(45) Date of Patent: Sep. 17, 2013

(54) ELECTRONIC DEVICE FOR DETECTING A TYPE OF A CHARGER DEVICE DURING A SLEEP MODE

(75) Inventors: Li-Ren Li, Tu-Cheng (TW); Chun-Hung Chou, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 289 days.

(21) Appl. No.: 13/078,849

(22) Filed: Apr. 1, 2011

(65) Prior Publication Data

US 2012/0246504 A1     Sep. 27, 2012

(30) Foreign Application Priority Data

Mar. 24, 2011  (CN) .......................... 2011 1 0072680

(51) Int. Cl.
 *G06F 1/26* (2006.01)
 *G06F 1/32* (2006.01)
(52) U.S. Cl.
 USPC ........... 713/324; 713/300; 713/310; 713/320; 713/321; 713/323; 713/330; 713/340

(58) Field of Classification Search
 USPC .................. 713/300, 310, 320–324, 330, 340
 See application file for complete search history.

(56) References Cited

U.S. PATENT DOCUMENTS

| 7,759,902 | B2 * | 7/2010 | Gangsto et al. | 320/134 |
| 8,143,860 | B2 * | 3/2012 | Gangsto et al. | 320/134 |
| 2010/0325457 | A1 * | 12/2010 | Lachwani et al. | 713/323 |

* cited by examiner

*Primary Examiner* — M Elamin
(74) *Attorney, Agent, or Firm* — Altis & Wispro Law Group, Inc.

(57) ABSTRACT

An electronic device includes a microcontroller (MCU) and a central processing unit (CPU). The CPU enters a sleep mode. The MCU determines whether a charger device is inserted in the electronic device according to whether power is supplied from the charger device, and wakes up the CPU when the charger device is inserted in the electronic device. After being awakened, the CPU detects a type of the charger device, and adjusts charging current from the charger device to the electronic device according to the type of the charger device.

9 Claims, 3 Drawing Sheets

ELECTRONIC DEVICE FOR DETECTING A TYPE OF A CHARGER DEVICE DURING A SLEEP MODE

BACKGROUND

1. Technical Field

The present disclosure relates to electronic devices, and more particularly to an electronic device for detecting a type of a charger device during a sleep mode.

2. Description of Related Art

Different charger devices, such as an adapter or host, supply different charging current. When a charger device is inserted in an E-book, the E-book must detect a type of the charger device and then adjust the amount of current that flows to the E-book ("charging current") according to the type of the charger device.

Generally, the E-book includes a central processing unit (CPU) and a microcontroller (MCU) cooperatively to carry out functions of the E-book. After a charger device is inserted in the E-book during a normal work mode, the CPU is responsible for detecting a type of the charger device, and the MCU has no capability to detect the type of the charger device.

When the E-book enters a sleep mode, the CPU also enters the sleep mode and cannot do anything, and the MCU can only execute basic functions such as recording input output (IO) events. If a charger device is inserted in the E-book during the sleep mode, the CPU cannot detect a type of the charger device, and the MCU has no capability to detect the type of charger device. Thus, the E-book cannot detect a type of the charger device and adjust charging current according to the type of the charger device, thereby having a non-ideal charging speed from the charger device to the E-book.

BRIEF DESCRIPTION OF THE DRAWINGS

The details of the disclosure, both as to its structure and operation, can be best understood by referring to the accompanying drawings, in which like reference numbers and designations refer to like elements.

DETAILED DESCRIPTION

Figure 1:
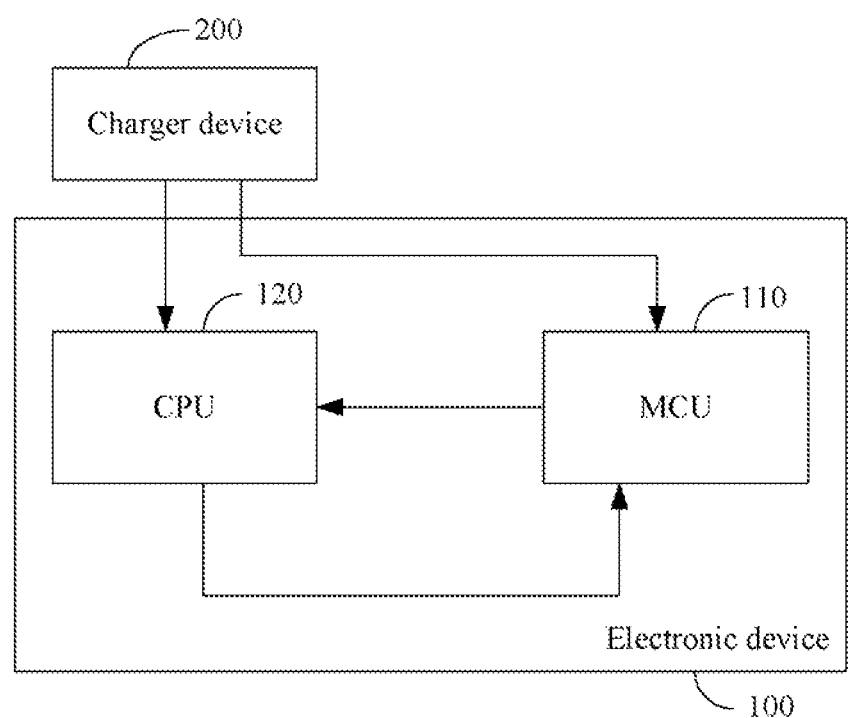
FIG. 1 is a schematic diagram of function modules of one embodiment of an electronic device in accordance with the present disclosure.

FIG. 1 is a schematic diagram of function modules of one embodiment of an electronic device 100 in accordance with the present disclosure. In one embodiment, the electronic device 100 may be an E-book, a mobile phone, a tablet computer, for example. The electronic device 100 includes a microcontroller (MCU) 110 and a central processing unit (CPU) 120 to cooperatively carry out functions of the electronic device 100. When the electronic device 100 enters a sleep mode, the CPU 120 also enters the sleep mode, which means that, at the time, the MCU 110 can only execute basic functions, such as detecting whether a charger device 200 is inserted in the electronic device 100. However, the MCU 110 cannot detect a type of the inserted charger device 200. In one example, the charger device 200 may be an AC/DC adapter or a host with a universal serial bus (USB) interface.

In one embodiment, when the electronic device 100 is in the sleep mode, the MCU 110 detects whether the charger device 200 is inserted in the electronic device 100 and wakes up the CPU 120 upon the charger device 200 being inserted. After being wakened up, the CPU 120 detects a type of the charger device 200, and adjusts charging current from the charger device 200 to the electronic device 100 according to the type of the charger device 200. After adjusting the charging current, the CPU 120 goes back to the sleep mode.

Figure 2:
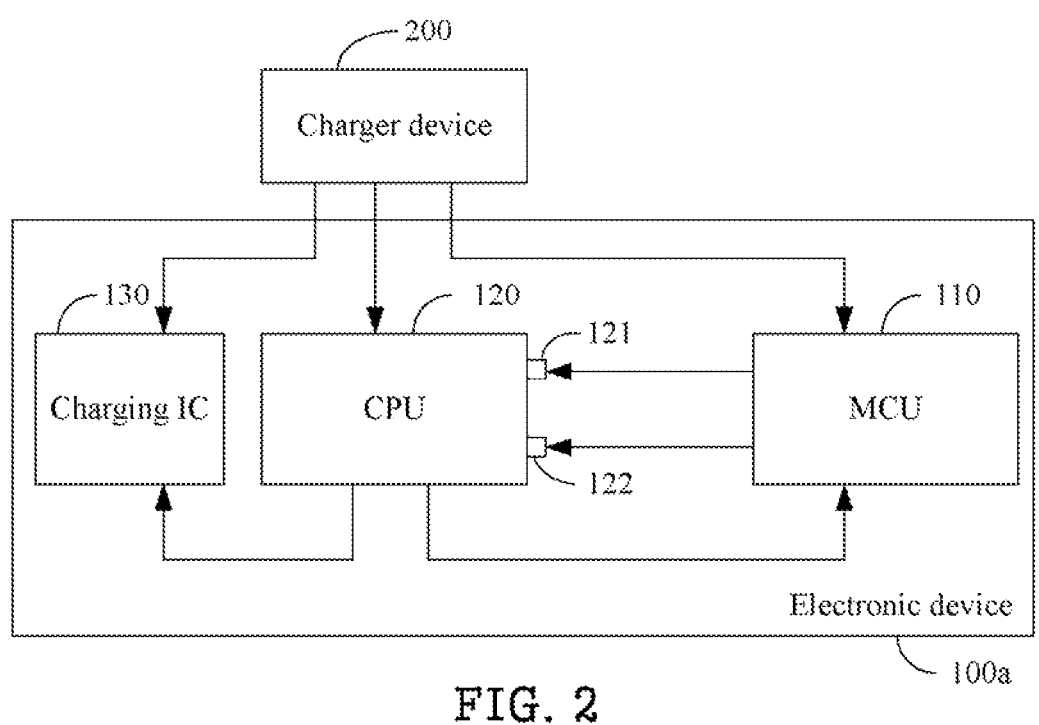
FIG. 2 is a schematic diagram of functional modules of another embodiment of an electronic device in accordance with the present disclosure.

FIG. 2 is a schematic diagram of functional modules of another embodiment of an electronic device 100*a* in accordance with the present disclosure. In one embodiment, the electronic device 100*a* is similar to the electronic device 100 of FIG. 1, and the difference is that the electronic device 100*a* further comprises a charging integrated circuit (IC) 130. When the electronic device 100*a* enters a sleep mode, the CPU 120 enters a sleep mode and cannot do anything.

If the charger device 200 is inserted in the electronic device 100*a*, then the MCU 110 is supplied power from the charger device 200. Thus, the MCU 110 determines whether the charger device 200 is inserted in the electronic device 100*a* according to whether power is supplied from the charger device 200, and wakes up the CPU 120 when the charger device 200 is inserted in the electronic device 100*a*. After being wakened up, the CPU 120 detects a type of the charger device 200.

In one embodiment, the MCU 110 stops supplying power to the CPU 120 so that the CPU 120 enters the sleep mode, and starts to supply power to the CPU 120 to wake up the CPU 120 when the charger device 200 is inserted in the electronic device 100*a*.

In one embodiment, the CPU 120 includes a first pin 121 and a second pin 122. The MCU 110 sets power of the first pin 121 and the second pin 122 to a low voltage level in order to stop supplying power to the CPU 120, and sets the power of the first pin 121 and the second pin 122 to a high voltage level to start to supply power to the CPU 120.

It should be noted that the high voltage level and the low voltage level can correspond to logical 1/0, and can be defined according to different standards. In one example, a voltage higher than 1.8V may be defined as the high voltage level, and a voltage lower than 1.8V may be defined as the low voltage level. In another example, a voltage higher than 3.3V may be defined as the high voltage level, and a voltage lower than 3.3V may be defined as the low voltage level.

The MCU 110 includes a wake flag. The wake flag can be set to a predefined value such as 1, which indicates the CPU 120 has been awakened because the charger device 200 is inserted in the electronic device 100*a*.

In one embodiment, when the charger device 200 is inserted in the electronic device 100*a*, the MCU 110 sets the wake flag to the predefined value such as 1, and sets the power of the first pin 121 and the second pin 122 to the high voltage level to wake up the CPU 120.

After being wakened up, the CPU 120 reads the wake flag from the MCU 110, and knows that the charger device 200 is inserted in the electronic device 100*a* according to the wake flag.

Afterwards, the CPU 120 transmits a request message to the charger device 200, and detects the type of the charger device 200 according to whether a response message is received from the charger device 200. In one example, if the CPU 120 receives no response message from the charger device 200, the CPU 120 determines that the type of the charger device 200 is an adapter with a USB interface. If the CPU 120 receives a response message from the charger device 200, the CPU 120 determines that the type of the charger device 200 is a host with a USB interface.

The charging IC 130 is connected to the CPU 120 and operable to adjust the charging current from the charger device 200 to the electronic device 100a after the charger device 200 is inserted in the electronic device 100a.

In one embodiment, the CPU 120 transmits an adjusting command to the charging IC 130 according to the type of the charger device 200, to control the charging IC 130 to adjust the charging current. For example, if the type of the charger device 200 is an adapter with a USB interface, the adjusting command is used to inform the charging IC 130 that a maximum charging current should be 2 A. If the type of the charger device 200 is a host with a USB interface, the adjusting command is used to inform the charging IC 130 that the maximum charging current should be 500 mA. Then, the charging IC 130 charges current from the charger device 200 to the electronic device 100a according to the maximum charging current. That is, the charging IC 130 controls the charging current from the charger device 200 to the electronic device 100a cannot be greater than the maximum charging current.

After adjusting the charging current, the CPU 120 transmits a sleep command to the MCU 110, and the MCU 110 sets the power of the first pin 121 and the second pin 122 to the low voltage level according to the sleep command so that the CPU 120 goes back to the sleep mode.

Figure 3:
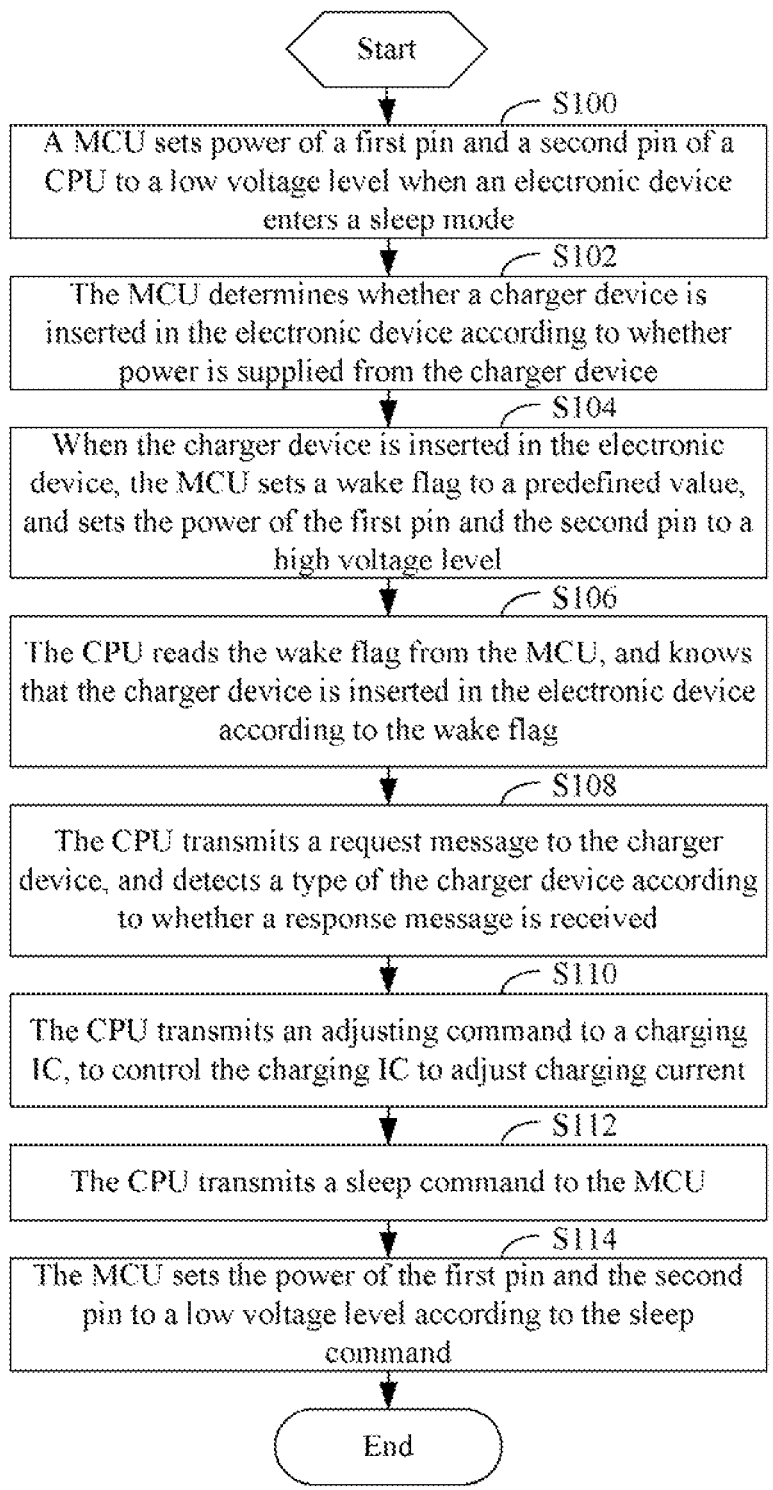
FIG. 3 is a flowchart of one embodiment of an electronic device detecting a type of a charger device and adjusting charging current in accordance with the present disclosure.

FIG. 3 is a flowchart of one embodiment of the electronic device 100a detecting a type of the charger device 200 and adjusting charging current in accordance with the present disclosure. In one embodiment, the electronic device 100a detects a type of the charger device 200 and adjusts charging current via the functional modules such as those of FIG. 2. Depending on the embodiment, additional blocks may be added, others deleted, and the ordering of the blocks may be changed while remaining well within the scope of the disclosure.

In block S100, when the electronic device 100a enters a sleep mode, the MCU 110 sets power of the first pin 121 and the second pin 122 to a low voltage level so that the CPU 120 enters a sleep mode.

In block S102, the MCU 110 determines whether the charger device 200 is inserted in the electronic device 100a according to whether power is supplied from the charger device 200.

In block S104, when the charger device 200 is inserted in the electronic device 100a, the MCU 110 sets a wake flag to a predefined value such as 1, and sets the power of the first pin 121 and the second pin 122 to a high voltage level to wake up the CPU 120. In one embodiment, the wake flag is set to the predefined value such as 1, which indicates that that the CPU 120 is wakened up because the charger device 200 is inserted in the electronic device 100a.

In block S106, after being wakened up, the CPU 120 reads the wake flag from the MCU 110, and knows that the charger device 200 is inserted in the electronic device 100a according to the wake flag.

In block S108, the CPU 120 transmits a request message to the charger device 200, and detects a type of the charger device 200 according to whether a response message is received from the charger device 200. In one example, if the CPU 120 receives no response message from the charger device 200, the CPU 120 determines that the type the charger device 200 is an adapter with a USB interface. If the CPU 120 receives a response message from the charger device 200, the CPU 120 determines that the type of the charger device 200 is a host with a USB interface.

In block S110, the CPU 120 transmits an adjusting command to the charging IC 130 according to the type of the charger device 200, to control the charging IC 200 to adjust the charging current.

In block S112, the CPU 120 transmits a sleep command to the MCU 110.

In block S114, the MCU 110 sets the power of the first pin 121 and the second pin 122 to a low voltage level according to the sleep command so that the CPU 120 goes back to the sleep mode.

In conclusion, when the charger device 200 is inserted in the electronic device 100(100a) during a sleep mode, the MCU 110 wakes up the CPU 120, and then the CPU 120 detects the type of the charger device 200 and adjusts the charging current according to the type of the charger device 200, which optimizes a charging speed from the charger device 200 to the electronic device 100(100a).

While various embodiments of the present disclosure have been described above, it should be understood that they have been presented using example and not using limitation. Thus the breadth and scope of the present disclosure should not be limited by the above-described embodiments, but should be defined in accordance with the following claims and their equivalents.

What is claimed is:

1. An electronic device, comprising:
a central processing unit (CPU), wherein the CPU comprises a first pin and a second pin; and
a microcontroller (MCU), wherein the MCU sets power of the first pin and the second pin to a low voltage level and thereby stops supplying power to the CPU when the CPU enters a sleep mode, the MCU is operable to wake up the CPU from the sleep mode according to a determination that a charger device is inserted into the electronic device, the determination being according to whether power is supplied from the charger device, and when the MCU determines that the charger device is inserted into the electronic device, the MCU sets the power of the first pin and the second pin to a high voltage level and thereby starts to supply power to the CPU to wake up the CPU;
wherein after the CPU wakes up, the CPU detects a type of the charger device, and adjusts charging current from the charger device to the electronic device.

2. The electronic device of claim 1, wherein after the CPU adjusts the charging current and is to enter the sleep mode, the CPU transmits a sleep command to the MCU, and the MCU sets the power of the first pin and the second pin to the low voltage level according to the sleep command.

3. The electronic device of claim 1, wherein the MCU comprises a wake flag, and the wake flag is set to a predefined value to indicate that the CPU has been awakened because the charger device is inserted in the electronic device.

4. The electronic device of claim 3, wherein when the charger device is inserted in the electronic device, the MCU sets the wake flag to the predefined value and sets the power of the first pin and the second pin to the high voltage level to wake up the CPU.

5. The electronic device of claim 4, wherein after being wakened up, the CPU reads the wake flag from the MCU, and knows that the charger device is inserted in the electronic device according to the wake flag.

6. The electronic device of claim 1, wherein the CPU transmits a request message to the charger device, and detects the type of the charger device according to whether a response message is received from the charger device.

7. The electronic device of claim 6, wherein the type of the charger device comprises an adapter and a host with a universal serial bus (USB) interface.

8. The electronic device of claim 6, further comprising a charging integrated circuit (IC) connected to the CPU and operable to adjust the charging current from the charger device to the electronic device after the charger device is inserted in the electronic device.

9. The electronic device of claim 8, wherein the CPU transmits an adjusting command to the charging IC according to the type of the charger device, to control the charging IC to adjust the charging current.

* * * * *